METHOD OF REFORMING GLASS FACE PLATES ON A SHAPING MOLD

Filed Dec. 27, 1966

INVENTOR.
LEWIS L. BOGNAR
BY Charles W. Gregg
AGENT

United States Patent Office 3,484,225 Patented Dec. 16, 1969

3,484,225
METHOD OF REFORMING GLASS FACE PLATES ON A SHAPING MOLD

Lewis L. Bognar, Painted Post, N.Y., assignor to Corning Glass Works, Corning, N.Y., a corporation of New York Filed Dec. 27, 1966, Ser. No. 604,997
Int. Cl. C03b *23/00*
U.S. Cl. 65—103 6 Claims

ABSTRACT OF THE DISCLOSURE

A method of reforming to a precise shape at least the inner surfaces of face plates of viewing panels for color television picture tubes, such panels being previously pressed formed from a molten glass-making material. Method incorporates relatively specific time-temperature cycle for heating and reforming the panels and aperture mask supporting pins may be inserted into the skirt portion of the panels during the latter part of the reforming thereof.

Figure 1:
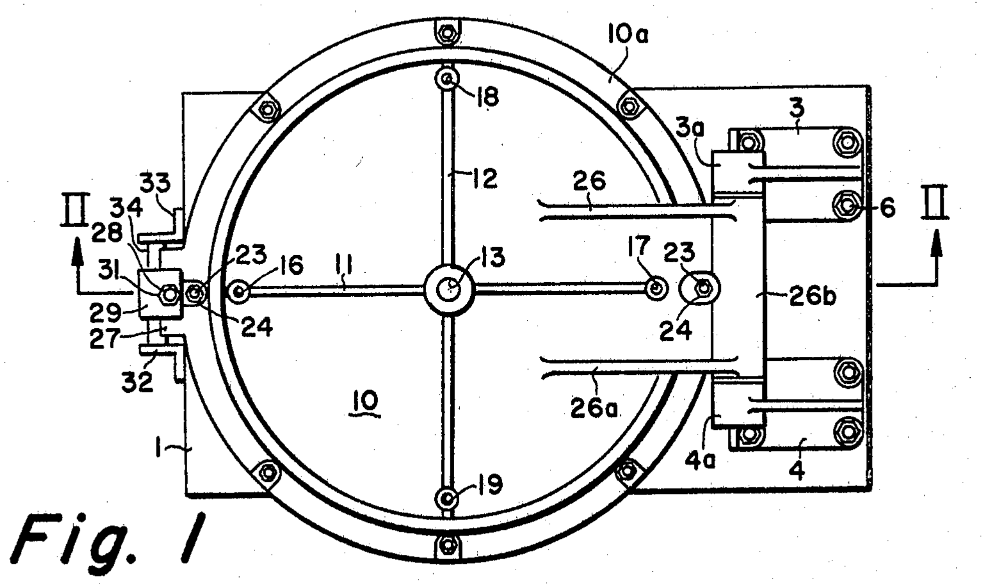

The present invention relates to viewing panels for cathode ray tubes. More particularly the present invention relates to viewing panels for cathode ray or television picture tubes used in color television receiving sets. Still more specificially the present invention relates to a method of reforming to a precise shape at least the inner surfaces of face plates of viewing panels for color television picture tubes, such panels being previously pressed from a molten glass-making material.

One process generally in use today in the manufacture of cathode ray or picture tubes for use in color television sets employs the steps of introducing different color emitting phosphor particles directly to the inner surface of the face plate of each of the viewing panels to be used in the manufacture of such tubes, and thereafter permanently coating such surface of each said face plate with a line-like or dot-like discrete pattern of each of the different color emitting phosphors introduced to said surface. One method of depositing said discrete patterns of the different color phosphors is the photographic method wherein the different color phosphors are introduced, one at a time, to the inner surface of the face plate of a viewing panel. In such method, a photosensitive emulsion, along with one of the color phosphors, is introduced to said surface of the face plate which is then exposed to a point light source through an aperture mask precisely positioned within a depending skirt portion of the viewing panel by a plurality of supporting pins precisely inserted in the inner wall of such panel portion, such mask exposing said emulsion to said source in a particular discrete line-like or dot-like pattern. The mask is thereafter removed, the exposed dots or lines of the exposed emulsion are developed causing such exposed areas of the emulsion as well as the corresponding areas of the color phosphor to be permanently deposited on the inner face plate surface, and the unexposed emulsion and its corresponding areas of the color phosphor are thereafter washed or rinsed from said surface. The aperture mask is then replaced in said precise position on said supporting pins and the above described step is then repeated for the deposition of each next color phosphor, the point light source being moved to a different predetermined position for the deposition of each such additional phosphor. Thus, a discrete pattern of each of the different color emitting phosphors is deposited on said inner surface of the face plate of the viewing panel. The details of such deposition of the patterns of the color emitting phosphors are well known to those skilled in the art of manufacturing color television picture tubes, and such method forms no part of the present invention but is briefly discussed above for purposes of a clear understanding of the problems help solved by the present invention. It is to be pointed out, however, that the previously mentioned different positioning of said light source, for the purpose of the exposure and subsequent development of each of the patterns of the color phosphor coatings provided on a viewing panel, must precisely conform to the paths to be taken by the electrons selectively beamed through the apertures of said aperture mask from an electron gun, or battery of such guns, provided in the neck of the tube envelope of which said viewing panel subsequently forms a part. Such precision is necessary to the production of the various colors of the picture to be displayed by the completed picture tube, as is also well known to those skilled in the art.

In the mass production of polychromatic cathode ray or television picture tubes, multiplicities of complemental tube envelope parts including viewing panels, funnels and necks of prescribed dimensions and configurations are formed, and one of each such parts is thereafter randomly selected from said multiplicities of parts and such selected sets of parts are subsequently sealed together to form a tube envelope. However, prior to such sealing, the inner surface of the face plate of each viewing panel is provided with discrete patterns of color emitting phosphor particles by the method, for example, previously discussed. In order, therefore, to assure that the previously discussed precise alignment of an electron gun with said discrete patterns of color phosphors may be attained in the manufacture of ecah of a plurality of color television picture tubes from randomly selected parts used to fabricate each such tube, it is necessary, for the use of mass production techniques including such random selection of parts, to provide viewing panels whose face plates each have an inner surface precisely conforming in shape to preselected standards for such shape.

In the press-forming of articles of a molten glass-making material, the configuration imparted to the articles during the forming operation oftentimes becomes distorted to a degree during the cooling of such articles. Such distortion is a result of uneven heat distribution in the equipment used in the press-forming operation and the resultant uneven heat distribution in the formed articles during and subsequent to the forming thereof by said equipment, and during the cooling of such articles subsequent to said forming. In other words, a glass article may be in a thermally unbalanced condition during and following the forming thereof and such condition, during the cooling of such article, results in an uneven shrinkage of the glass of the article thereby causing distortion of the shape originally imparted to such article by said press-forming equipment. As previously mentioned, at least the inner surfaces of the face plates of viewing panels for color cathode ray or television picture tubes must, within specified tolerable limits or ranges, precisely conform in configuration to selected standards for the shapes of such inner surfaces. However, during and following the forming of such viewing panels by a pressing operation, the shape of the face plates of some of such panels may, due to the conditions previously mentioned, become distorted to an intolerable degree, that is, to such a degree that the panels are not within the prescribed or specified limits or ranges of variations considered tolerable. Therefore, in order to improve the selectivity of the pressed viewing panels, that is, in order to reduce the quantity of panels that are rejected for not being within the ranges of the specifications for the shape of such panels, it has been found expedient to precisely reform at least the face plates of the panels to reduce or eliminate any distortion in the shapes of such face plates.

In the light of the foregoing discussion, it is an object of the present invention to provide a method of reforming to a precise degree at least the inner surface of face plates of previously press-formed viewing panels for color television picture tubes.

In accomplishing the above object of the invention a viewing panel, at least the inner surface of the face plate of which is to be reformed, is suitably heated and such face plate is then pressed against a mold surface having a configuration precisely corresponding to that desired for such inner surface. The pressing of said face plate is performed by use of an elastic or flexible hermetic elastic membranous member actuated by pressurized fluid. Aperture mask supporting pins may be inserted into the skirt portion of said viewing panel during the latter part of the reforming thereof.

Other objects and characteristic features of the invention will become apparent as the description proceeds.

It is pointed out that the term pressurized fluid as employed herein is intended to include compressed air or other compressed gases as well as liquids under pressure.

Figure 2:
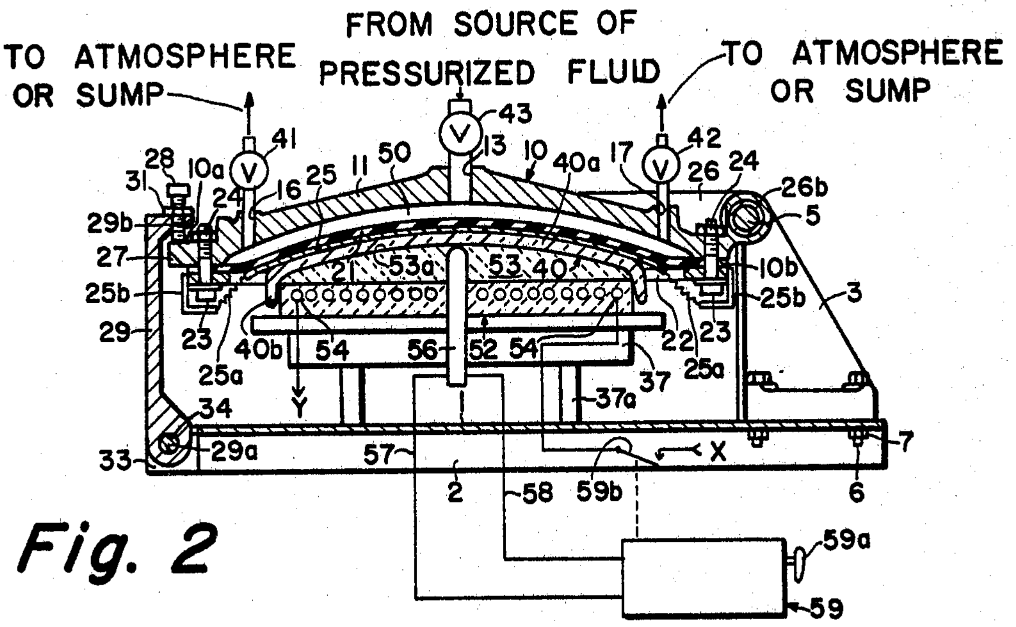

The invention will best be understood with reference to the accompanying drawings wherein:

FIG. 1 is a top plan view of part of an apparatus to be used in the practice of the invention; and FIG. 2 is a sectional view of the apparatus of FIG. 1 taken generally along line II—II of FIG. 1, such view illustrating several steps in the practice of the invention when reforming the face plate of a television picture tube viewing panel against a convex mold surface.

Similar reference characters refer to similar parts in each of the figures of the drawings.

Referring to the drawing in detail there is provided a table or platform 1 of a sturdy construction and which, if found necessary, is reinforced across the bottom thereof by angle or channel members, such as 2. On one end of the top of table 1 there is mounted first and second triangularly shaped upright support members 3 and 4. Members 3 and 4 are spaced apart from each other and the top of member 3 includes a bearing portion **3*a* for receipt and support of one end of an axle or pin 5 which is a pivot pin for a hinge arrangement or assembly to be hereinafter further discussed. Similarly, member 4 includes at the top thereof a bearing portion 4*a* for receipt and support of the other end of axle or pin 5. Support members 3 and 4 are secured to the top surface of table 1 by bolts, such as 6, extending down through feet provided on the bottoms of the support members and through table or platform 1. Nuts, such as 7, are screwed onto the bottoms of said bolts to securely mount support members 3 and 4 on table 1** as illustrated in the drawings.

Referring further to FIGS. 1 and 2, there is shown a slightly domed circular plate 10 made of a rigid material such as aluminum, steel, etc. and having an outer annular rim portion **10*a*. Plate 10 is illustrated as having on its upper surface ribs 11 and 12 which cross each other at a 90° angle in the center of such plate at which point there is provided in the plate a passageway 13 extending through the plate. Ribs 11 and 12 are not necessarily required but, without adding excessive weight to plate 10, reinforce the plate against possible distortion thereof if the plate is made of relatively thin material. There is provided at first and second ends of rib 11, first and second passageways 16 and 17, respectively, which also extend through plate 10 but are of smaller diameter than passageway 13. First and second passageways 18 and 19, similar to passageways 16 and 17, are provided at first and second ends of rib 12, respectively. The purpose of said passageways will be discussed hereinafter. It is pointed out that plate 10** need not necessarily be circular as illustrated in FIG. 1 but may have an elliptical, substantially rectangular or other shape if desired or expedient for the reforming of viewing panel face plates or portions thereof. This will become readily apparent as the description proceeds.

The outer border of a circular elastic or flexible hermetic membranous member 21 (FIG. 2) of substantially the same diameter as plate 10 is disposed against bottom surface **10*b* of previously mentioned rim portion 10*a* of plate 10, and said border is secured to surface 10*b*, in a hermetic relationship therewith, by an annular clamp member 22 and bolts, such as 23, which extend upwardly through said clamp member at eight points equally spaced around such clamp member. Said bolts then extend upwardly through said outer border member 21 and rim portion 10*a* of plate 10. Nuts, such as 24, are screwed onto the upper ends of the bolts, such as 23, and are tightened to squeeze said outer border of member 21 between clamp member 22 and said bottom surface 10*b* and, thereby, provide said hermetic relationship between such outer border member 21 and surface 10*b* of rim portion 10*a* of plate 10. This arrangement will be readily understood by a brief study of the drawings. Member 21** may, for example, be made of silicone rubber.

Below the lower or bottom surface of member 21 is disposed a membranous heat-shield member 25 of a slightly smaller diameter than member 21 and formed from a heat-resistant material such as asbestos cloth, for example. Heat-shield member 25 is resiliently held in its position below member 21 by a plurality of coil springs, such as **25*a*, having first ends securely connected in any convenient manner to the outer periphery of member 25. The other ends of said springs are connected to suitable supports, such as 25*b*, secured about the outer periphery of previously mentioned clamp member 22 in any convenient manner, such as by welding for example. By such arrangement it is believed readily apparent that heat-shield member 25 is resiliently supported below the lower surface of flexible member 21 and extends across a large area of the expanse of such lower surface. The purpose of heatshield member 25** will be discussed hereinafter in this description.

Plate 10 further includes a pair of rib member 26 and **26*a* (FIG. 1) which extend from one side of the plate beyond the outer periphery of rim portion 10*a* of plate 10 and which have formed on the ends thereof a bearing portion 26*b* through which extends the perviously mentioned axle or pivot pin 5 to complete the hinge assembly or arrangement also previously mentioned. By such arrangement it is obvious that plate 10 is supported by upright supports 3 and 4 and such plate is movable through an arc of travel extending from the horizontal position shown in FIG. 2 of the drawings to at least a vertical position. The side of rim portion 10*a* of plate 10 diametrically opposite said one side of the plate, that is, diametrically opposite the side provided with the hinge arrangement described above, is provided with an extension 27 which protrudes outwardly beyond the remainder of the outer periphery of rim portion 10*a* of plate 10. Extension 27 provides a seat for a hold-down bolt 28 of a clamping device 29** described below.

On the end of table or platform 1, opposite to that on which supports 3 and 4 are mounted, are provided first and second spaced-apart lugs 32 and 33 which are securely fastened to said table in any convenient manner, such as by welding for example. The lower end of previously mentioned clamping device 29 is provided with a hole **29*a* and a pivot pin or axle 34 (FIG. 2) extends through said hole and into cooperating holes provided in lugs 32 and 33. It is thus apparent that clamping device 29 is pivotably mounted on said end of table or platform 1 and may be swung or moved through an arc of travel into or away from its position shown in the drawings. The upper end of clamping device 29 has an extending portion 29*b* through which the previously mentioned hold-down bolt 28 vertically extends, such bolt being screwed into cooperating threads provided in said portion 29*b*. A lock nut 31 is also provided on bolt 28 and, after bolt 28** is screwed through portion 29*b* of clamping device 29 to a desired distance, lock nut 31 may be tightened against the top surface of portion 29*b* of clamping device 29 to lock bolt 28 in said portion. As previously mentioned, the lower end of bolt 28 seats against the top surface of extention 27 on rim portion 10*a* of plate 10. Clamping device 29 is thus used to clamp plate 10 down in its horizontal position illustrated in FIG. 2 of the drawings. The purpose of such clamping will become apparent as the description proceeds.

A stand 37 having legs, such as 37*a*, is disposed on the top of platform or table 1 with the bottoms of said legs resting on such table top. A mold heater plate 52 having an outer periphery generally corresponding to the lower inner surface of the depending skirt portion of the viewing panels to be reformed is placed on the top of stand 37. On the upper surface of heater plate 52 there is positioned a mold 53 having an outer periphery generally corresponding to the upper inner surface of the depending skirt portion of said viewing panels and a convex upper mold surface 53*a* having minutely precise contour lines corresponding to the shape to which the inner surfaces of said viewing panels are to be reformed, such mold 53 also being of a minimum vertical cross-sectional thickness. Heater plate 52 and mold 53 are both preferably formed of a low-expansion ceramic material, and the heights of stand 37 and of heater plate 52 are such that the top surface 53*a* of mold 53 will extend above the annular rim portion 10*a* of plate 10 when such plate is in its horizontal position shown in FIG. 2 of the drawings.

There is embedded below the top surface of heater plate 52 an electrical heating element comprising electrical resistance heating coils, such as 54, generally evenly spaced below said top surface of heater plate 52 so as to be able to generally evenly heat mold 53. A thermocouple 56 extends vertically upward through the centers of heater plate 52 and mold 53 to a distance such that the hot junction of such thermocouple is positioned just below the center of top surface 53*a* of mold 53 and will be able to detect the temperature of such mold surface. The first and second thermoelectric elements of thermocouple 56 are connected by electrical leads or conductors 57 and 58, respectively, to input terminal of suitable electrical signal amplifying and control apparatus 59 having a manually actuable control lever or regulating knob 59*a*. Apparatus 59 selectively actuates an electrical contact 59*b* to connect or disconnect a first end of heating coils 54 to terminal X of a source of electrical current of a suitable voltage and capacity for the proper energization and heating of said coils and, thereby, heater plate 52. The second end of heating coils 54 is connected directly to terminal Y of said current source. For purposes of simplification of the drawings said source of electrical current is not shown therein.

Thermocouple signal responsive apparatus and control systems such as that just described, and including thermocouple 56, apparatus 59 and electrical contacts such as 59*b*, are well known. However, it is pointed out that electrical current from said current source is connected across heating coils 54 so long as contact 59*b* remains closed. When such heating coils heat the top surface 53*a* of mold 53 to a temperature such that thermocouple 56 provides over conductors 57 and 58 to apparatus 59 an electrical output signal corresponding to the manual setting of control lever 59*a* of such apparatus, electrical contact 59*b* is actuated to its open position shown in FIG. 2 of the drawings and the supply of electrical current to heating coils 54 is temporarily interrupted. Upon the subsequent cooling of heating coils 54 due to said interruption of current and the resultant cooling of mold surface 53*a* of mold 53, the signal output from thermocouple 56 decreases below that called for by the setting of manual control lever 59*a* of apparatus 59 and such apparatus again actuates electrical contact 59*b* to its closed position to again supply said electrical current to heating coils 54.

Having described in detail the reforming apparatus shown in FIGS. 1 and 2 of the drawings, a detailed example of the method of the present invention will now be set forth.

A previously press-formed glass viewing panel, such as panel 40 shown in FIG. 2 of the drawings, is provided, the face plate of such panel having a thickness of approximately 0.400 inch, and the glass-making material out of which said panel is press-formed having a softening point temperature in the vicinity of about 680° C., an annealing point temperature in the vicinity of about 540° C. and a strain point temperature of about 475° C. Such panel is preferably taken directly from its press-forming apparatus immediately following the forming thereof and while the temperature of the panel is above the strain point temperature of the glass. Alternatively, however, the panel may be a panel which was press-formed at some time previously and allowed to cool to room temperature in which case the panel is uniformly reheated to above the strain point temperature of the glass. In any event the panel must be at a temperature of from about 490° C. to 540° C. upon the start of the reforming process herein disclosed.

Assuming that the panel has just been press-formed as mentioned above, the panel is reheated so as to provide a temperature differential between the inner and outer surfaces of the face plate of the panel but uniform temperatures throughout each respective plane or layer of the thickness of such panel. To accomplish such reheating, it has been found expedient to place the panel, with the outer surface of the face plate of the panel uppermost, in a preheated oven or kiln having overhead gas-air fired radiant burners and held at an ambient temperature of about 725° C., the roof of such kiln being maintained at an average temperature of from 1100° to 1200° C. After a period of approximately three minutes in such a preheated oven the outer surface of the face plate of the panel is at a temperature in the vicinity of 700° C. while the inner surface of said face plate is at a temperature in the vicinity of 620° C. It is pointed out that such temperatures are above the softening point temperature and the annealing point temperature, respectively, of the glass of which the panel is formed. However, during the transfer of the panel from said oven to the reforming apparatus the temperatures of said surfaces of the panel drop approximately 20° to 30° C.

During the reheating of the panel as discussed above, top surface 53*a* of previously mentioned mold 53 (FIG. 2) is maintained at a temperature of approximately 540° C., that is, at a temperature approximate the annealing point temperature of the glass which the panel is made, such temperature of said mold surface being maintained at said temperature by the heating coils 54 in heating plate 52 and the control system previously discussed. Following the reheating of a panel as discussed above, the panel is rapidly transferred to the reforming apparatus shown in FIGS. 1 and 2 of the drawings, plate 10 of such apparatus having been previously raised to a vertical position to open the apparatus so that the panel can be positioned on mold 53. The panel is positioned on mold 53 with the inner surface of the face plate of the panel precisely positioned on upper surface 53*a* of the mold. In FIG. 2 of the drawings, viewing panel 40, including face plate 40*a* and skirt portion 40*b* thereof, is illustrated as so positioned. Subsequent to the positioning of the panel on mold 53, theremocouple 56 detects the temperature of the inner surface of such panel and the electrical current to heating coils 54 is interrupted if such current is not already cut off from such coils. However, if the temperature of mold surface 53*a* thereafter falls below 540° C., the electrical current to said coils is again supplied thereto to maintain mold surface 53*a* at 540° C. It is pointed out at this point in the description that the inner surface of the face plate of each of a plurality of panels to be identically precisely reformed must be identically and precisely positioned on the upper mold surface of the mold used for reforming such plurality of panels, otherwise the desired correspondence among all of the reformed inner surfaces of the face plates of said plurality of panels will not be attained.

Immediately following the precise positioning of a panel, such as 40, on mold 53 as discussed above, plate 10 is returned towards its horizontal position shown in FIG. 2 of the drawings. During such return of plate 10, the lower surface of heat-shield member 25 contacts the outer surface of face plate 40*a* of panel 40 and begins to stretch springs 25*a* so that such shield begins to spread tautly over said outer surface while flexible member 21 is simultaneously inherently stretched over the top surface of heat-shield member 25. Following the complete return of plate 10 to its said horizontal position shown in FIG. 2 of the drawings, members 21 and 25 are tautly stretched and spread, respectively, over said respective surfaces as illustrated in FIG. 2. Clamping device 29 is then actuated to its position shown in FIG. 2 to maintain plate 10 in its horizontal position shown, and members 21 and 25 in their said stretched and spread conditions, respectively.

It will be noted that passageway 13 in the center of plate 10 is shown in FIG. 2 as connected to a first side of a fluid control valve 43. Similarly, passageways 16 and 17 in plate 10 are shown in FIG. 2 as connected to first sides of fluid control valves 41 and 42, respectively. It will be understood that passageways 18 and 19 in plate 10 are similarly connected to fluid control valves, similar to 41 and 42, but not shown in the drawings for purposes of simplification thereof. The other side of valve 43, as noted in FIG. 2, may be connected to a source of pressurized fluid such as compressed air, for example, normally at a pressure of approximately 40 to 51 p.s.i. The second sides of valves 41 and 42 (as well as the above mentioned valves connected to passageways 18 and 19) are connected to a suitable fluid sump or to atmosphere as noted in FIG. 2. It is pointed out that, if considered expedient to do so, the second side of valve 43 could alternatively be connected to atmosphere or to a suitable sump, and passageways 16, 17, 18 and 19 then may be connected through their respectives valves to said source of pressurized fluid.

Immediately following the clamping of plate 10 in its closed position as previously discussed, valve 43 is actuated to its position to permit pressurized fluid from said source to flow into space or chamber 50 between the bottom surface of plate 10 and the upper surface of member 21. Simultaneously with said actuation of valve 43, the valves, such as 41 and 42, are at least partially opened to vent part of the pressurized fluid supplied to chamber 50 to atmosphere thereby causing a flow of said pressurized fluid across the upper surface of membrane 21. It is pointed out, however, that at such time the pressure within chamber 50 is maintained at approximately 20 to 25 p.s.i. This is accomplished by actuation of the valves, such as 41 and 42, to a selected open degree, as is believed readily apparent. If it is alternatively arranged so that passageways 16, 17, 18 and 19 may be connected to said source of pressurized fluid, and passageway 13 to atmosphere or said sump as previously mentioned, then operation opposite to that just described results. This is also believed to be readily apparent.

The 20 to 25 p.s.i. pressure maintained in chamber 50, as discussed above, presses down on member 21 with a force corresponding to such pressure. Such force or pressure uniformly presses member 21 down against member 25 and the latter member uniformly down against face plate 40*a* of panel 40 causing the inner surface of such face plate to be uniformly pressed down against top surface 53*a* of mold 53 to reform such face plate, and especially such inner surface thereof, to precisely conform to the shape of such top mold surface 53*a*. The pressurized fluid flowing through chamber 50 at such time also provides for cooling of members 21 and 25, and of the outer surface of face plate 40*a*, as further discussed below.

During the above described fluid pressing and reforming operation, the temperature of the inner surface of face plate 40*a* of panel 40 is rapidly lowered to the temperature of mold 53, that is, to the annealing temperature of the glass of which panel 40 is formed. Simultaneously with such cooling of the inner surface of face plate 40*a*, the outer surface of such free plate is at first cooled at an even more rapid rate of heat-shield member 25 which was at ambient temperature before the reforming operation was started. Heat-shield member 25 becomes heated toward the temperature of the outer surface of face plate 40*a* at a relatively rapid rate at first, such rate diminishing as the temperature of the heat-shield member more closely approaches the temperature of said outer surface. Sometime subsequent to the start of heating of heat-shield member 25 by the heat from said outer surface, flexible member 21 begins to be heated by heat transfer from member 25, and the previously mentioned cooling by the pressurized fluid flowing through chamber 50 is effective to maintain member 21 at as low a temperature as possible. It is thus apparent that heat-shield member 25, in addition to rapidly cooling the outer surface of face plate 40*a*, prevents the exposure of flexible member 21 to excessive heat while said flow of pressurized fluid through chamber 50 simultaneously carries as much heat as possible away from the upper surface of member 21.

The temperatures of the outer surface of face plate 40*a* and of heat-shield member 25 are reduced to the temperature of the inner surface of such face plate and of mold 53 in a period of approximately one minute following the beginning of the reforming operation. At such time the pressurized fluid source is again disconnected or shut off from passageway 13 and such passageway is connected through valve 43 to a source of negative pressure, that is, a source of vacuum. Simultaneously therewith, the valves, such as 41 and 42, are actuated to closed conditions. Member 21 is thereby drawn up away from membrane 25 and against plate 10 to terminate the pressing or reforming operation, while plate 10 provides further cooling of membrane 21. Plate 10 is then again raised to its vertical open position and panel 40 is removed from mold 53 for additional cooling or, preferably, immediate transfer to an annealing apparatus for annealing of the panel, such annealing apparatus being well known in the art.

It is pointed out that it is preferable to insert the previously mentioned aperture mask supporting pins in the inner wall of a viewing panel depending skirt portion, such as portion 40*b* of panel 40 (FIG. 2) during the latter part of the step of reforming the face plate of the panel by the force of pressurized fluid supplied thereagainst in the manner discussed above. This dispenses with an additional step of later precisely positioning the viewing panel and reheating such panel for insertion of said supporting pins. Furthermore, by insertion of said pins during the latter part of said reforming step, optimum assurance that the pins are precisely inserted in the panel in the desired precise conformity with the reformed face plate of the panel is attained. Accordingly, to accomplish the insertion of said supporting pins as discussed above, plate 52 may be provided around the periphery thereof with a pluralit yof recesses (not shown in the drawings) in which pin insertion devices of pin insertion apparatus may be disposed, such recesses, for example, corresponding in number to the number of supporting pins to be inserted in the panel. Such pin insertion apparatus is well known in the art. It is further pointed out that, during the latter part of said reforming step, the inner wall of the depending skirt portion of a panel is at a very suitable temperature for insertion therein of heated aperture mask supporting pins.

It is pointed further out that a method of and an apparatus for reforming articles of a thermoplastic material is disclosed in copending application Ser. No. 603,593 filed Dec. 21, 1966, by Robert W. Bennett et al. and entitled "Reforming Thermoplastic Articles," such application being assigned to the same assignee as the present application. The apparatus and method of the present application is similar to those disclosed in said copending application but the method claimed herein comprises an improvement in the method of said copending application, such improved method enabling minutely precise reforming of the inner surfaces of face plates of viewing panels for color television picture tubes to within prescribed limits of tolerable variations from preselected standards for the shapes of such surfaces.

What is claimed is:

1. A method of reforming to a precise shape at least the inner surface of the face plate of a previously formed glass panel for a colored television picture tube, such method comprising;

(A) selectively thermally conditioning at least said face plate of said panel so that the temperature throughout each layer of the thickness of such face plate is uniform throughout each respective layer and so that the temperatures of the outer and inner surfaces of such face plate, following the transfer of said panel to reforming apparatus, approximate the softening point and annealing point temperatures, respectively, of the glass from which said viewing panel is formed;

(B) precisely positioning said viewing panel with said inner surface of said face plate on the surface of a mold maintained at a temperature approximate said annealing point temperature, said mold surface having contour lines corresponding to said precise shape to which the inner surface of the face plate is to be reformed;

(C) immediately following said positioning of said viewing panel, disposing against said outer surface of said face plate one surface of a resiliently held membranous heat-shield member, such member having its other surface disposed against one surface of a flexible hermetic membranous member;

(D) immediately subjecting the surface of said hermetic member, opposite said one surface thereof, to pressure from a source of pressurized fluid, such pressure pressing said heat-shield member against said outer surface of said face plate, while simultaneously cooling such surface, and pressing said inner surface of such face plate into precise conformity with the contour lines of said mold surface while said mold cools such inner surface;

(E) maintaining said pressure against said opposite surface of said hermetic member to continue said pressing and the cooling of said inner and outer surfaces until both such surfaces are at the temperature of said mold surface; and (F) thereafter, relieving said pressure and removing said heat-shield member from said outer surface and said inner surface from said mold surface, whereby a viewing panel having at least the inner surface of the face plate thereof reformed to a precise shape is attained.

2. The method in accordance with claim 1 and further including inserting aperture mask supporting pins into the inner wall of the depending skirt portion of said viewing panel during said pressing of the inner surface of said face plate of such panel.

3. The method in accordance with claim 1 and including the further step of annealing said viewing panel immediately following the arrival of said both inner and outer surfaces of said face plate at the temperature of said mold surface.

4. A method of precisely and identically individually reforming the face plate of each of a plurality of similar and previously formed glass viewing panels for colored television picture tubes, such method comprising;

(A) providing a mold having a configuration generally corresponding to that of said viewing panels and a mold surface having contour lines precisely conforming with a standard for the shape to which each of said face plates are to be reformed, said mold being heated to and maintained at a temperature approximating the annealing point temperature of the glass from which said viewing panels are formed;

(B) selecting one of said panels and thermally conditioning said panel so that the inner and outer surfaces of the face plate of such panel will approximate, respectively, the temperature of said mold surface and the softening point temperature of said glass when said panel is thereafter disposed on said mold, the temperature throughout each layer of the thickness of said face plate, following such thermal conditioning, being uniform throughout each respective layer;

(C) immediately following said conditioning of said panel, individually precisely positioning such panel upon said mold with the bottom surface of the face plate of such positioned panel upon said mold surface;

(D) individually disposing a first planar surface of a flat flexible and hermetic membrane adjacent the top surface of said face plate positioned on said mold surface, the areal expanse of said planar surface being at least equal to the areal expanse of such face plate;

(E) applying pressure from a pressurized fluid source across a second planar surface of said membrane, opposite to said first planar surface thereof, to uniformly press the face plate of the viewing panel adjacent which the membrane is disposed against said mold surface to precisely reform the shape of such face plate to said contour lines of such mold surface, said fluid also cooling said membrane and, therethrough, said face plate simultaneously with the cooling of such face plate by said mold;

(F) maintaining said pressure across said second planar surface of said membrane until the top surface of the reformed face plate cools to the maintained temperature of said mold;

(G) following such reforming of the face plate of said viewing panel, removing said pressure from said membrane and the viewing panel from said mold; and (H) sequentially performing the foregoing steps on each of said plurality of viewing panels whereby the face plates of all of said plurality of viewing panels precisely conform in shape to said contour lines of said mold surface and, therefore, to each other and to said standard for the reformed shape for such face plates.

5. The method in accordance with claim 4 and further including inserting aperture mask supporting pins into the inner wall of the depending skirt portion of each of said viewing panels during said pressing of the inner surface of the face plate of each respective panel.

6. The method in accordance with claim 4 and including the further step of annealing each of said plurality of viewing panels immediately following the reforming of the face plate of each respective panel.

References Cited

UNITED STATES PATENTS

| | | | |
|---|---|---|---|
| 3,004,295 | 10/1961 | Bottoms et al. | 65—106 X |
| 3,187,404 | 6/1965 | Fiore. | |
| 3,244,497 | 4/1966 | Copeland | 65—356 X |

ARTHUR D. KELLOGG, Primary Examiner

U.S. Cl. X.R.

65—104, 105, 106, 162, 273, 275